(12) United States Patent
Bridgford et al.

(10) Patent No.: US 8,379,850 B1
(45) Date of Patent: Feb. 19, 2013

(54) METHOD AND INTEGRATED CIRCUIT FOR SECURE ENCRYPTION AND DECRYPTION

(75) Inventors: Brendan K. Bridgford, Vienna, VA (US); Stephen M. Trimberger, San Jose, CA (US); Jason J. Moore, Albuquerque, NM (US); Edward S. Peterson, Rio Rancho, NM (US); James Wesselkamper, Albuquerque, NM (US); John C. Hoffman, Corrales, NM (US)

(73) Assignee: Xilinx, Inc., San Jose, CA (US)

( * ) Notice: Subject to any disclaimer, the term of this patent is extended or adjusted under 35 U.S.C. 154(b) by 251 days.

(21) Appl. No.: 12/900,805

(22) Filed: Oct. 8, 2010

(51) Int. Cl.
*H04L 9/00* (2006.01)
*H04K 1/04* (2006.01)

(52) U.S. Cl. ............. 380/45; 380/37; 713/187; 713/189

(58) Field of Classification Search ............ 380/45, 380/37
See application file for complete search history.

(56) References Cited

U.S. PATENT DOCUMENTS

| | | | |
|---|---|---|---|
| 6,539,092 B1 | 3/2003 | Kocher | |
| 6,931,543 B1 | 8/2005 | Pang et al. | |
| 7,117,373 B1 | 10/2006 | Trimberger et al. | |
| 7,146,501 B2 * | 12/2006 | Tanaka | 713/176 |
| 7,373,668 B1 | 5/2008 | Trimberger | |
| 2006/0294018 A1 * | 12/2006 | Tuoriniemi | 705/59 |
| 2010/0125739 A1 * | 5/2010 | Creary et al. | 713/189 |

OTHER PUBLICATIONS

U.S. Appl. No. 12/791,608, filed Jun. 1, 2010, Bridgford et al.
U.S. Appl. No. 12/877,958, filed Sep. 8, 2010, Trimberger.
U.S. Appl. No. 12/877,968, filed Sep. 8, 2010, Trimberger.

* cited by examiner

*Primary Examiner* — Taghi Arani
*Assistant Examiner* — Mohammad L Rahman
(74) *Attorney, Agent, or Firm* — LeRoy D. Maunu; Lois D. Cartier

(57) ABSTRACT

In one embodiment, a cryptographic device is provided. The cryptographic device includes a persistent memory and a decryption control circuit coupled to the persistent memory. The decryption control circuit is configured to receive an encrypted data stream and decrypt a first portion of the encrypted data stream using a first cryptographic key stored in the persistent memory, the first portion including a second cryptographic key. The decryption circuit is configured to decrypt a second portion of the encrypted data stream using the second cryptographic key, the second portion of the encrypted data stream including payload data.

17 Claims, 6 Drawing Sheets

METHOD AND INTEGRATED CIRCUIT FOR SECURE ENCRYPTION AND DECRYPTION

GOVERNMENT CONTRACT

The U.S. Government may have certain rights to this invention as provided for by the terms of Government Contract #N41756-10-C-4505 (OSD/Navy Engineering Logistics Office).

FIELD OF THE INVENTION

One or more embodiments of the present invention generally relate to cryptography, and more particularly to the secure decryption of data.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs), for example. CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that are programmable to implement logic functions. The function blocks of CPLDs, CLBs of FPGAs, and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key, corresponding to the particular encryption algorithm, and the key must be protected from unauthorized discovery.

A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, the amount of current, and thus the amount of power, used by a device is monitored while the device is decrypting the bitstream. During normal operation, the amount of power used by a device varies depending on the logic gates activated at a given time. By monitoring variations in the power consumption while the device is decrypting a configuration bitstream, the attacker can identify decryption operations performed and determine the decryption key. In another type of attack, an attacker attempts to guess a key, password or authentication code using many trial-and-error attempts. The attacker may attempt to determine the key value or force the device to accept tampered data as if it were legitimate.

One or more embodiments of the present invention may address one or more of the above issues.

SUMMARY

In one embodiment, a method for secure configuration of a programmable integrated circuit (IC) is provided. The programmable IC includes a first cryptographic key stored in a persistent memory. A configuration bitstream is input to the programmable IC. The configuration bitstream includes a first portion that is encrypted with the first cryptographic key. The first portion also includes a second cryptographic key. The configuration bitstream includes a second portion encrypted with the second cryptographic key. The first portion of the configuration bitstream is decrypted with the first cryptographic key on the programmable IC. The second cryptographic key is obtained from the decrypted first portion of the configuration bitstream. The second portion of the configuration bitstream is decrypted by the programmable IC with the second cryptographic key obtained from the decrypted first portion of the configuration bitstream. Configuration data from the decrypted second portion of configuration bitstream is stored in configuration memory of the programmable IC.

In another embodiment, the configuration bitstream includes a third portion and a fourth portion. The third portion is encrypted with the first cryptographic key and includes a third cryptographic key. The fourth portion is encrypted with the third cryptographic key and includes configuration data. The encrypted third portion of the configuration bitstream is decrypted with the first cryptographic key. The encrypted fourth portion of the configuration bitstream is decrypted with the third cryptographic key from the decrypted third portion of the configuration bitstream. The decrypted configuration data from the fourth portion of the configuration bitstream is stored in the configuration memory of the programmable IC.

Configuration data from the decrypted first portion of configuration bitstream is stored in the configuration memory of the programmable IC in another embodiment.

The first portion of the configuration bitstream includes a cipher text block length value indicative of lengths of cipher blocks in the configuration bitstream in another embodiment.

In another embodiment, the decrypting of the encrypted second portion of the configuration bitstream with the second cryptographic key from the decrypted first portion of the configuration bitstream includes selecting a block of the input configuration bitstream following the first portion of the configuration bitstream. The selected block has a length equal to the cipher text block length value. The selected block is decrypted with the second cryptographic key.

The configuration bitstream includes a key address of the persistent memory corresponding to the first cryptographic key in the configuration bitstream in another embodiment. At least a second decryption key is stored in the persistent memory of the programmable IC. The decrypting of the encrypted first portion of the configuration bitstream with the first cryptographic key includes retrieving the first key from a location of the persistent memory indicated by the key address.

In another embodiment, the configuration bitstream includes a third portion encrypted with the second cryptographic key. The encrypted third portion of the configuration bitstream is decrypted with the second cryptographic key. The decrypted configuration data from the decrypted third portion of configuration bitstream is stored in the configuration memory of the programmable IC.

The second and third portions of the configuration bitstream are adjacent portions of the configuration bitstream in another embodiment. Each of the second and third portions of the configuration bitstream has a length equal to a cipher text block length.

The second portion of the configuration bitstream includes a third cryptographic key and the configuration bitstream includes a third portion encrypted with the second cryptographic key in another embodiment. The third portion of the configuration bitstream includes configuration data. The encrypted third portion of the configuration bitstream is decrypted with the second cryptographic key from the decrypted second portion of the configuration bitstream. The decrypted configuration data from the decrypted third portion of the configuration bitstream is stored in the configuration memory of the programmable IC.

The programmable IC is configured to selectively prevent readout of the persistent memory in another embodiment.

In another embodiment, the configuration bitstream includes a third portion encrypted with a third cryptographic key. The third portion of the configuration bitstream includes configuration data and is located after the first portion and prior to the second portion in the configuration bitstream. The encrypted third portion of the configuration bitstream is decrypted with the third cryptographic key after the decrypting of the first portion of the configuration bitstream and prior to the decrypting of the second portion of the configuration bitstream.

The third cryptographic key is equal to the first cryptographic key in another embodiment.

Key expansion is performed on the second cryptographic key concurrently with the decrypting of the third portion of the configuration bitstream in another embodiment.

The second cryptographic key is authenticated after decryption of the first portion of the configuration bitstream in another embodiment.

In another embodiment, a cryptographic device is provided. The cryptographic device includes a persistent memory and a decryption circuit coupled to the persistent memory. The decryption circuit is configured to receive an encrypted data stream including a plurality of data blocks and a plurality of cryptographic keys exclusive from the plurality of data blocks. The decryption circuit is configured to decrypt a first portion of the encrypted data stream using a cryptographic key stored in the persistent memory. The first portion includes a first one of the plurality of cryptographic keys. The decryption circuit is further configured to decrypt a second portion of the encrypted data stream using the first one of the plurality of cryptographic keys. The second portion of the encrypted data stream includes a first one of the plurality of data blocks.

The decryption circuit is further configured to decrypt a third portion of the encrypted data stream including a second one of the plurality of cryptographic keys using the cryptographic key stored in persistent memory in another embodiment. The decryption circuit is configured to decrypt a fourth portion of the encrypted data stream including a second one of the plurality of data blocks with the second one of the plurality of cryptographic keys.

The first portion of the encrypted data stream includes a second one of the plurality of data blocks in another embodiment.

In yet another embodiment, a method for encrypting a message is provided. An unencrypted message is input. A plurality of cryptographic keys is generated. The plurality of cryptographic keys are not derived from the unencrypted message. A first block is encrypted with a first one of the plurality of cryptographic keys. The first block includes a second one of the plurality of cryptographic keys. A second block is encrypted with the second one of the plurality of cryptographic keys. The second block includes a first portion of the unencrypted message. The first and second blocks are stored in a computer readable media.

In another embodiment, a third block is encrypted with the first cryptographic key. The third block includes a third one of the plurality of cryptographic keys. A fourth datablock including a second portion of the unencrypted message is encrypted with the third one of the plurality of cryptographic keys. The third and fourth blocks are stored along with the first and second blocks in the computer readable media.

The first block includes a second portion of unencrypted message in another embodiment.

It will be appreciated that various other embodiments are set forth in the Detailed Description and Claims, which follow.

BRIEF DESCRIPTION OF THE DRAWINGS

Various aspects and advantages of embodiments of the invention will become apparent upon review of the following detailed description and upon reference to the drawings in which.

DETAILED DESCRIPTION

Figure 1:
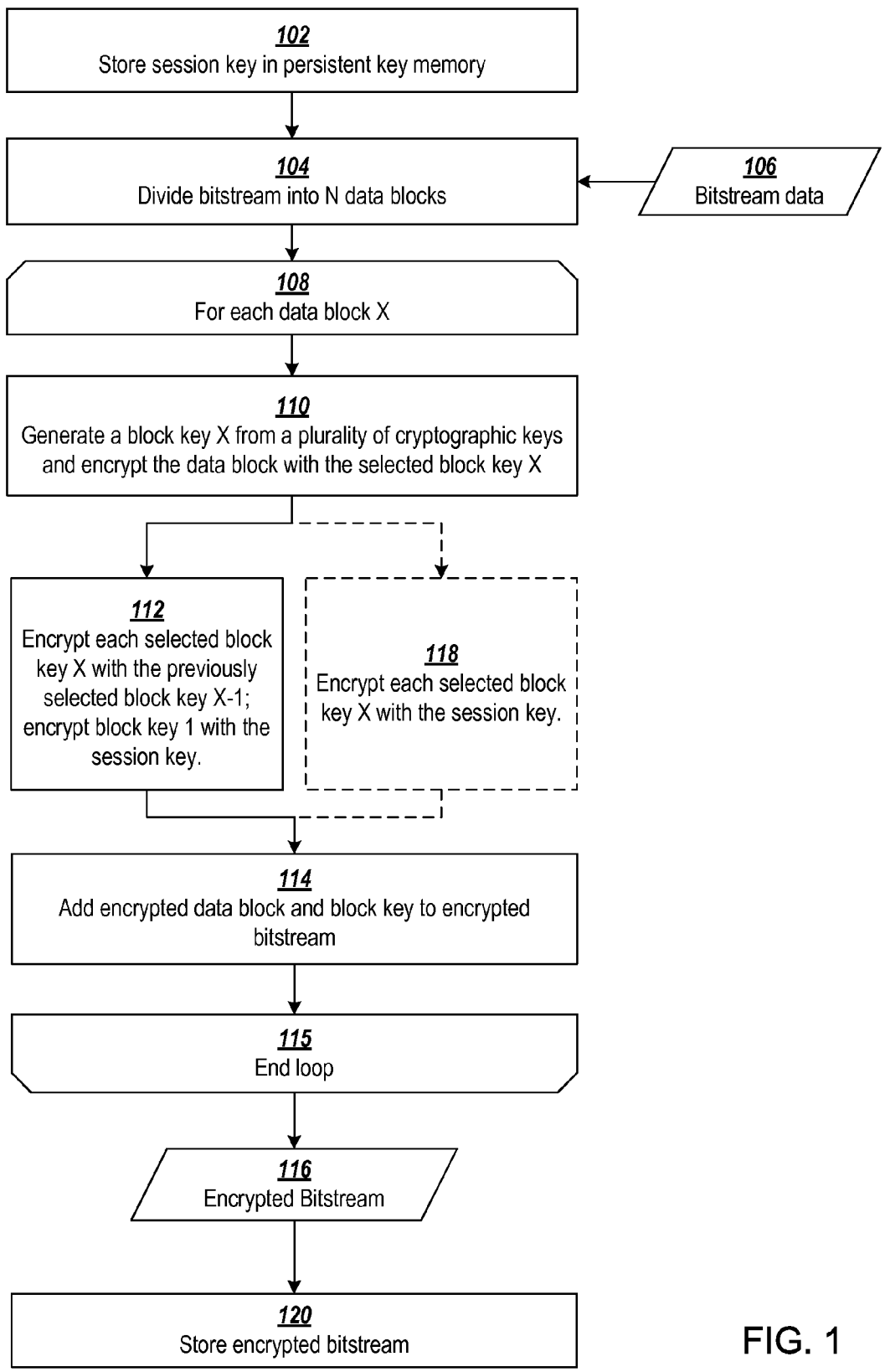
FIG. 1 shows a flowchart of an example process for encryption of a bitstream in accordance with one or more embodiments of the invention.

During configuration of programmable logic, the configuration bitstream can be intercepted and used to make unauthorized copies of the design. Although the configuration bitstream can be encrypted, the decryption key may be vulnerable to discovery through power analysis. In a power analysis attack, current used by a device is monitored over time. During normal operation, the amount of power used by a device varies depending on the logic gates activated at a given time. By monitoring variations in the power consumption during decryption, the attacker can identify operations performed and ultimately determine the decryption key. The disclosed embodiments provide countermeasures to improve resistance to power analysis attacks.

In an example involving DES encryption, sixteen rounds of encryption/decryption are performed on each block of data. Because similar operations are performed for each round, power consumption data can be identified for each round. Comparison of the power consumed in different rounds can identify key dependent operations and, ultimately, the key used for decryption. For example, the DES key schedule is produced by rotating 28-bit key registers. On a computer or microprocessor, the rotations are generally implemented using a right shift operation where a zero is shifted into the most significant bit by default. If the bit of the key shifted out of the register is a one, an additional operation is needed to cause the most significant bit to be equal to one. In logic, the rightmost bit must be routed back to the left side to be shifted in. The power consumption of that bit will likely be higher because of the increased capacitance on that routing. Therefore, a different power signature will be produced for each rotation depending on the bit of the decryption key. As used herein, a power signature may be referred to as power fluctuations, a power consumption signature, or a power consumption waveform, and such terms are used interchangeably herein. Other encryption ciphers, including both symmetric and asymmetric ciphers, also include key-dependent operations that are susceptible to power analysis. In DPA, a large number of samples are gathered by repeating encryption over a number of cycles. Samples gathered from each cycle are compared and analyzed to identify a common power signature among the repeated cycles from which the decryption can be identified.

Noise present in the power signal may complicate the DPA process and increase the number of samples needed to determine the decryption key. There are three sources of noise present when performing power analysis of decryption circuits: intrinsic, quantization and algorithmic. Intrinsic noise may be generated by other circuitry coupled to the power network of the decryption circuit and the random movement of charge carriers within conductors. Quantization noise is introduced through the analog to digital quantization during sampling the power signals. Algorithmic noise is due to the randomness of the data bytes being processed by the smartcard. Various filtering strategies can be used to reduce the noise present in data samples. However, filtering will not work on algorithmic noise because any filter would also reduce the desired bias signal. Algorithmic noise is commonly reduced by using unbiased random data as input to be decrypted. When random noise is evenly distributed, the noise will have little effect on the average of power consumption data from repeated rounds of decryption. As long as the input is satisfactorily random, the algorithmic noise can be averaged out. For this reason, DPA attacks are generally performed using a number of different data blocks as input. These data blocks may be randomly-generated and will not correspond to valid configuration data.

DPA processes using random bitstreams as input may be detected by determining whether the decrypted bitstream successfully configures the target device. One method of preventing DPA using random data and custom bitstreams tracks and disables a device after a number of failed configuration attempts. In this manner, the device is disabled before enough data can be gathered to perform DPA. However, as the number of programmable resources increases within programmable ICs, valid bitstreams may become large enough that DPA may successfully be performed without resulting in failed configurations that may be detected and trigger disablement of the device, thus allowing enough data to be gathered to determine the decryption key.

One or more embodiments of the present invention inhibit DPA data gathering by using multiple keys generated independently from one another to encrypt and decrypt respective portions of a bitstream. Limiting the use of each key to decryption of a small portion of the bitstream reduces the number of DPA data samples that can be gathered for a key in a completed round of decryption and configuration. If an attacker cannot gather data from enough different samples, the noise in the system will dominate the signal and the DPA attack will fail to identify the key.

Use of multiple cryptographic keys for decryption requires providing the cryptographic keys to the decrypting device in a secure manner that will not reveal the keys to an attacker. In current methods of bitstream encryption, a single cryptographic key to be used for decryption is placed in a persistent memory of the decrypting device by the manufacturer or the customer who generated the encrypted bitstream. However, persistent memory may be expensive and can only store a limited number of cryptographic keys. As used herein, persistent memory refers to a non-volatile memory, battery backed memory, or other memory that can retain a memory state when the device is powered off.

In one embodiment, multiple cryptographic keys, which are used to decrypt respective portions of the bitstream, are encrypted with an initial key stored in persistent memory of the decrypting device. The encrypted cryptographic keys are transmitted to the device within the bitstream along with the portions of the bitstream to be decrypted using the cryptographic keys. Once decrypted using the initial key from the persistent memory, the decrypted cryptographic keys are used to decrypt the corresponding portions of the bitstream. In this manner, cryptographic keys used to decrypt the portions of bitstream data are securely transmitted to the decrypting device.

For ease of explanation, the initial key stored in persistent memory is referred to as the "session key" or "Key 0." Cryptographic keys used to decrypt the portions of the bitstream are referred to as "block keys." Each block key in a plurality of N block keys may be individually referred to a Key X, where $1 <= X <= N$.

The block keys may be encrypted/decrypted with the initial session key using a number of cryptographic schemes. In one embodiment, the block keys are each directly encrypted/decrypted with the initial key stored in the persistent memory. In another embodiment, one or more of the block keys may be indirectly encrypted with the initial session key. For example, in one implementation, each block key X in the bitstream may be encrypted/decrypted using a previous decrypted block key X−1. The first block key received in the bitstream may be decrypted using the initial session key stored in persistent memory.

FIG. 1 shows a flowchart of an example process for encryption of a bitstream in accordance with one or more embodiment of the invention. A developer or manufacturer configures a programmable integrated circuit (IC) to store an initial session key in an internal persistent memory at process block 102. A bitstream of a design 106 is divided into a plurality of N data blocks at process block 104. For each data block, beginning at process loop 108, a respective block key is generated and is used to encrypt the data block at process block 110. As described above and as shown by process block 112, in one embodiment each block key X is encrypted with the previous block key X−1. In another embodiment, shown in process block 118, each block key X is encrypted with the initial session key, which was stored in the persistent memory at process block 102. The encrypted data block and the corresponding encrypted cryptographic key are added to the encrypted bitstream at process block 114. After all data blocks and corresponding keys have been encrypted and added to the encrypted bitstream, process block 115 ends process loop 108 and the complete encrypted bitstream 116 is stored in a persistent memory at process block 120.

Figure 2:
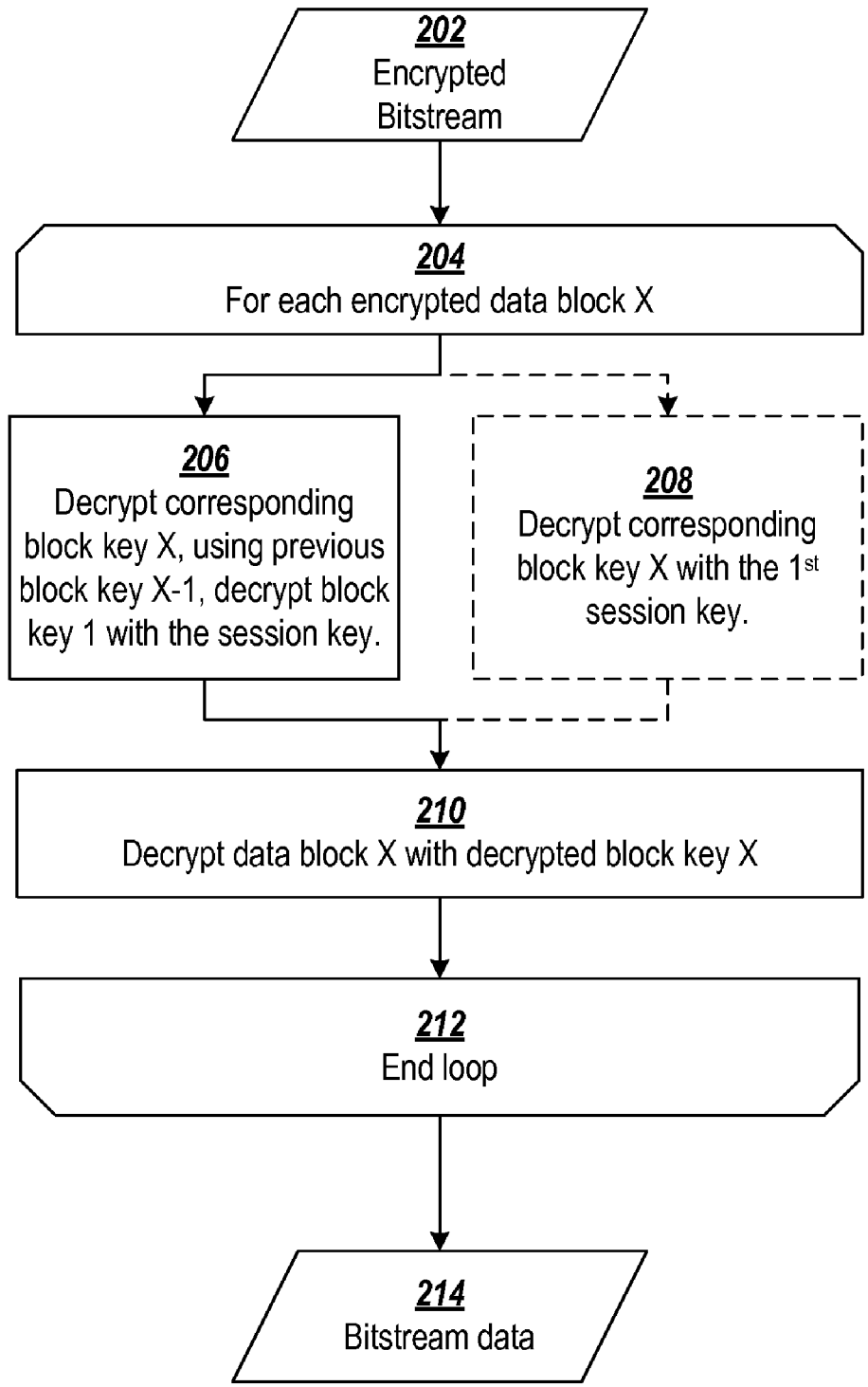
FIG. 2 shows a flowchart of an example process for secure configuration of a programmable IC in accordance with one or more embodiments of the invention.

FIG. 2 shows a flowchart of an example process for secure configuration of a programmable IC in accordance with one or more embodiments of the invention. At startup, the encrypted bitstream 202 is retrieved from an external memory and decrypted within the programmable IC.

For each encrypted data block X, beginning at process loop 204, the block key X corresponding to the data block is decrypted with the previous block key X−1 at process block 206. The first block key (Key 1) is decrypted using the initial session key (Key 0), which is stored in persistent memory. In another embodiment, each block key X is decrypted with the initial session key (Key 0).

The data block(s) corresponding to the decrypted session key is decrypted at process block 210. After all data blocks have been decrypted and process block 212 ends the process loop 204, the resulting decrypted data blocks form the decrypted bitstream 214.

Figure 3:
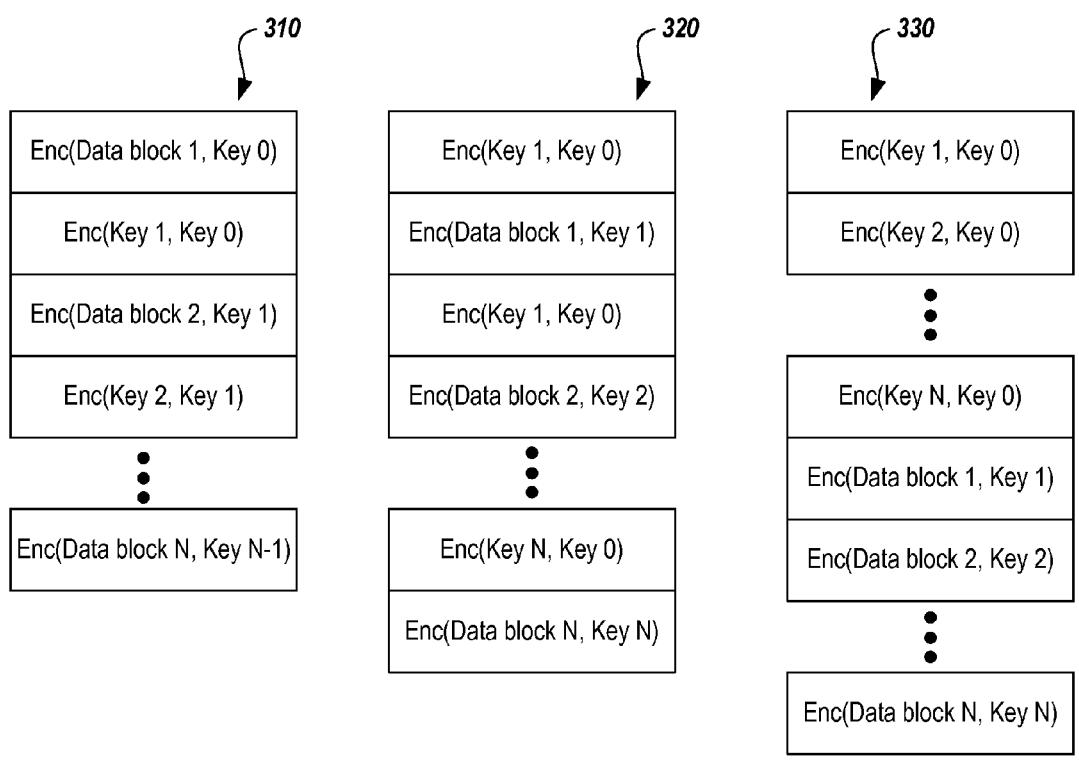
FIG. 3 illustrates several example bitstream formats that may be used in accordance with one or more embodiments of the invention.

As noted above, the block keys may be encrypted with the initial session key using a number of different cryptographic schemes. FIG. 3 illustrates several example bitstream formats that may be used in various methods for encryption/decryption of the block keys. In reference to the example formats described herein, the notation:

Encrypted block=Enc(data_encrypted,cipher_key)

is used to describe an encrypted block. The data_encrypted field indicates the data block and/or cryptographic key contained in the encrypted portion. The cipher_key field indicates the cryptographic key that was used to encrypt the data block and/or cryptographic key indicated by data_encrypted. The cryptographic key indicated by the cipher_key field is needed to decrypt the encrypted block.

Bitstream 310 illustrates an example format, where data block X+1 and the next block key used for decryption (Key X+1) are encrypted with block key X. For example, data block 2 and key 2 are encrypted with block key 1. Note that key 1 is encrypted with the initial session key (Key 0). Each block key X is used to decrypt each data block X+1. In this illustrative example, the initial session key (Key 0) is also used to encrypt and decrypt the first data block (data block 1).

Bitstream 320 shows an example format where each block key is encrypted with the initial session key (Key 0) stored in persistent memory of the IC. Each block key X, once decrypted with the initial session key, is used to decrypt a corresponding data block X. Because this method uses the same key to encrypt each key, the block keys may be generated separately without previous knowledge of the other keys. This may be advantageous if portions of the bitstream data are encrypted and provided by multiple sources. However this format is not as secure as the format shown in 310 because the initial session key is used multiple times, allowing more data samples to be gathered.

In bitstreams 310 and 320, the payload of the encrypted bitstream alternates between block keys and data blocks. However, it will be recognized that encrypted block keys may be received from the bitstream in a number of different orderings. For example, bitstream 330 shows an example format where encrypted block keys are located at the beginning of the encrypted bitstream. These keys may be decrypted with the initial session key (Key 0) and buffered in a temporary key storage, such as volatile memory, until an encrypted data block corresponding to the key is received from the bitstream.

When encrypted block keys are received in advance, decryption and other processing of the keys may be performed concurrently with decrypting of the bitstream data to increase throughput. For example, many block ciphers includes a key expansion algorithm, where the decryption key is "expanded" to produce a set of round keys to be used for encrypting or decrypting each cipher block. As key expansion can take many clock cycles, one embodiment improves efficiency by having keys delivered in advance of the corresponding data block that is decrypted with the key. This allows the key to be expanded concurrently with the decryption of another cipher block using a previously expanded key. In this manner, latency due to key expansion can be eliminated.

The example bitstream formats described herein are intended to be non-exhaustive. One skilled in the art will recognize that a number of other bitstream formats and cryptographic schemes may be used to securely provide block keys to a decryption device. For example, several portions of the encrypted bitstream may resemble the format illustrated in bitstream 310. The first key of each portion may be encrypted with the initial session key in a format similar to that shown in 320.

The bitstream formats illustrated in FIG. 3 depict each encrypted block key and encrypted data block as separate encrypted blocks even though the same block key X is used to decrypt encrypted block key X+1 and encrypted data block X+1. One skilled in the art will recognize that a data block and block key may be encrypted within the same encryption block. Moreover, one skilled in the art will recognize that the each portion of the bitstream encrypted with a block key may include several smaller cipher data blocks, each individually encrypted with the same block key. For example, the AES cryptographic cipher is defined to encrypt data blocks of 128 bits. In one embodiment of the invention utilizing this AES cipher, the data block size may equal 512 bits and include four 128-bit cipher blocks that are each encrypted/decrypted with a key derived from the same block key.

As used herein, the cipher text length refers to the total bit size of the data (bitstream data, block keys, padding, etc.) that are encrypted with a block key.

Security is improved by increasing the frequency of the key updates and minimizing the per-key message block size. One skilled in the art will recognize the balance between improved security and efficiency. In one embodiment, the cipher text length is a fixed value. In another embodiment, flexibility in striking this balance may be provided by allowing the cipher text length to be programmable by a value included in the bitstream. For example, in one implementation, a cipher block length register is provided to allow authorized bitstreams to set the maximum cipher text block length. Upon initialization, the cipher block length register is set to a default value, for example the size of one cipher block. The first data block may indicate a new cipher text block length, which is used to update the register with a new user-specified value. In this manner, the decrypting device allows subsequent data blocks to be a user-defined cipher text length. The cipher text block length should be a multiple of the cipher block size used by the implemented encryption algorithm. In yet another embodiment, the cipher text block length may be changed multiple times in a bitstream, such as whenever a key is updated.

Figure 4:
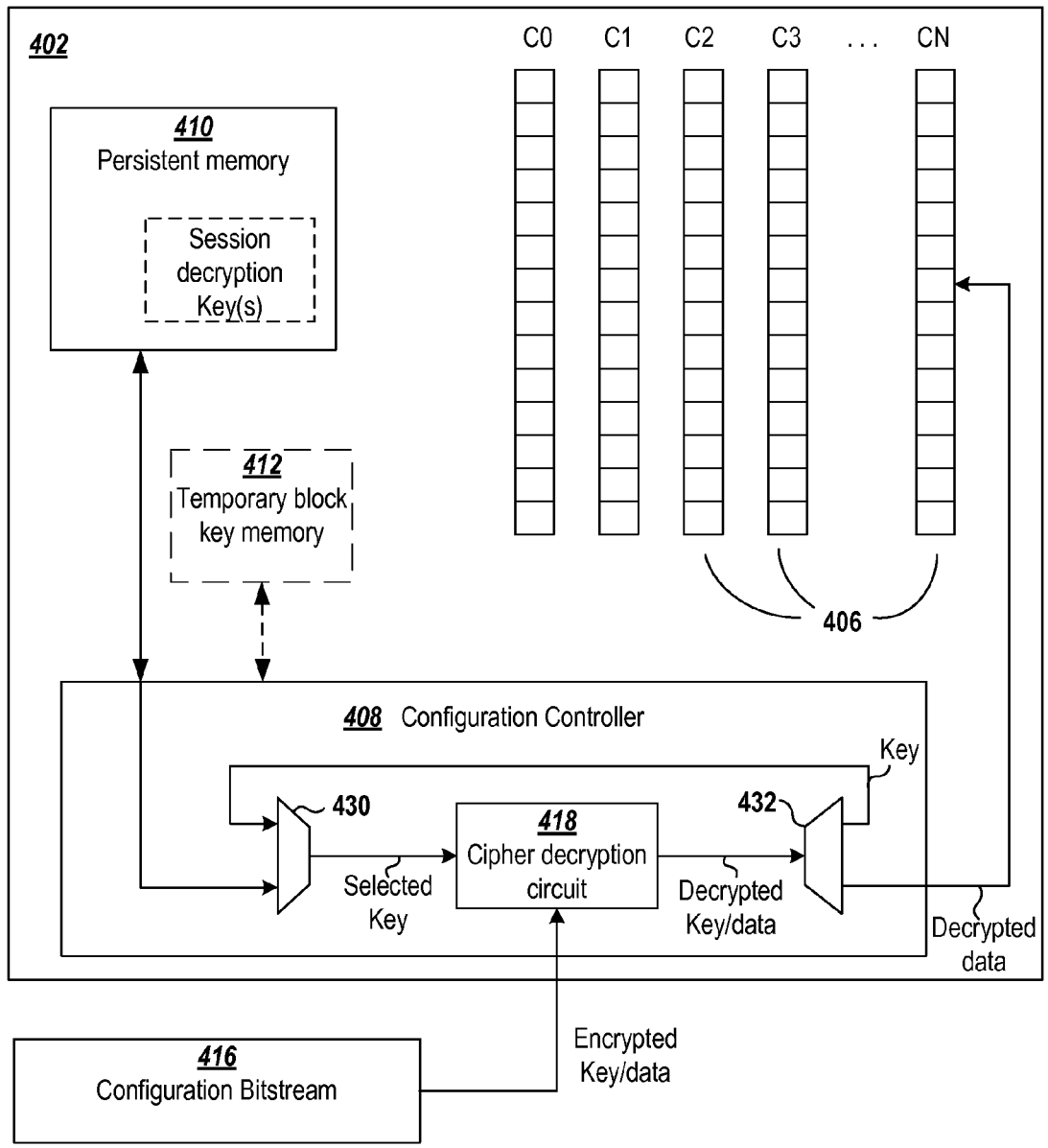
FIG. 4 shows a block diagram of an example programmable logic IC configured for secure configuration in accordance with one embodiment of the invention.

FIG. 4 illustrates a block diagram of a programmable IC 402 configured to be resistant to DPA while decrypting a configuration bitstream. Programmable IC 402 includes configuration memory frames 406, a persistent memory 410 that stores one or more initial decryption keys, a temporary block key memory 412, a configuration controller 408, and programmable resources (not shown). The configuration controller 408 includes a cipher decryption circuit 418. The configuration controller 408 is configured to determine the key corresponding to each received encrypted portion of the bitstream. As discussed above, one or more initial session cryptographic keys are stored in persistent memory 410 of the programmable IC 402. The programmable IC is configured to prevent a user from externally accessing the persistent memory to read out the initial session cryptographic keys. The configuration controller is configured to retrieve an initial session key from persistent memory 410 and block keys of the configuration bitstream as decrypted by cipher decryption circuit 418. In this illustrative example, cryptographic key selection is represented by MUX 430. The encrypted portion of the configuration bitstream 416 and selected block key are input to cipher decryption circuit 418. The decrypted block is analyzed by configuration controller 408 to store decrypted block keys and data appropriately. In this illustrative example, separation of decrypted data and keys is represented by MUX 432.

In one embodiment, the configuration controller 408 includes a temporary key register (not shown) designed to store the key to be used to decrypt the next block of data. In some embodiments, the IC includes multiple key registers in the temporary block key memory 412. Multiple block keys may be decrypted and sent to the temporary block key memory 412. To conserve power, unused registers in the temporary block key memory may be disabled while not in use. At a later time, a block key may then be moved from the temporary block key memory 412 into the temporary key register (not shown) of the configuration controller 408. As the strength of this scheme lies in frequent key updating, in some embodiments the configuration controller 408 includes a mechanism to enforce key updates. For example, in one embodiment the temporary key register is cleared after a number of cipher blocks have been decrypted. The movement of keys may be triggered by an instruction in the bitstream or may be triggered by the completion of the previous decryption operation with the previous block key.

One or more embodiments may be used alone or in combination with other DPA mitigation techniques such as random noise generation, signal to noise reduction, or clock skipping. For example, in one countermeasure, the block key and/or bitstream data includes data integrity checks (error correction codes). These checks serve not only to ensure that the key is correctly loaded, but also to detect tampering with the key. In another embodiment, use of random or custom bitstreams to circumvent the safeguard provided by embodiments of the present invention may be detected and countermeasures taken to prevent subsequent DPA data gathering operations. For example, use of random bitstreams may be detected by tracking the number of failed decryption and/or configuration attempts. When the number of failed attempts exceeds a threshold, the device may be disabled and/or the decryption keys stored in persistent memory may be erased.

Figure 5:
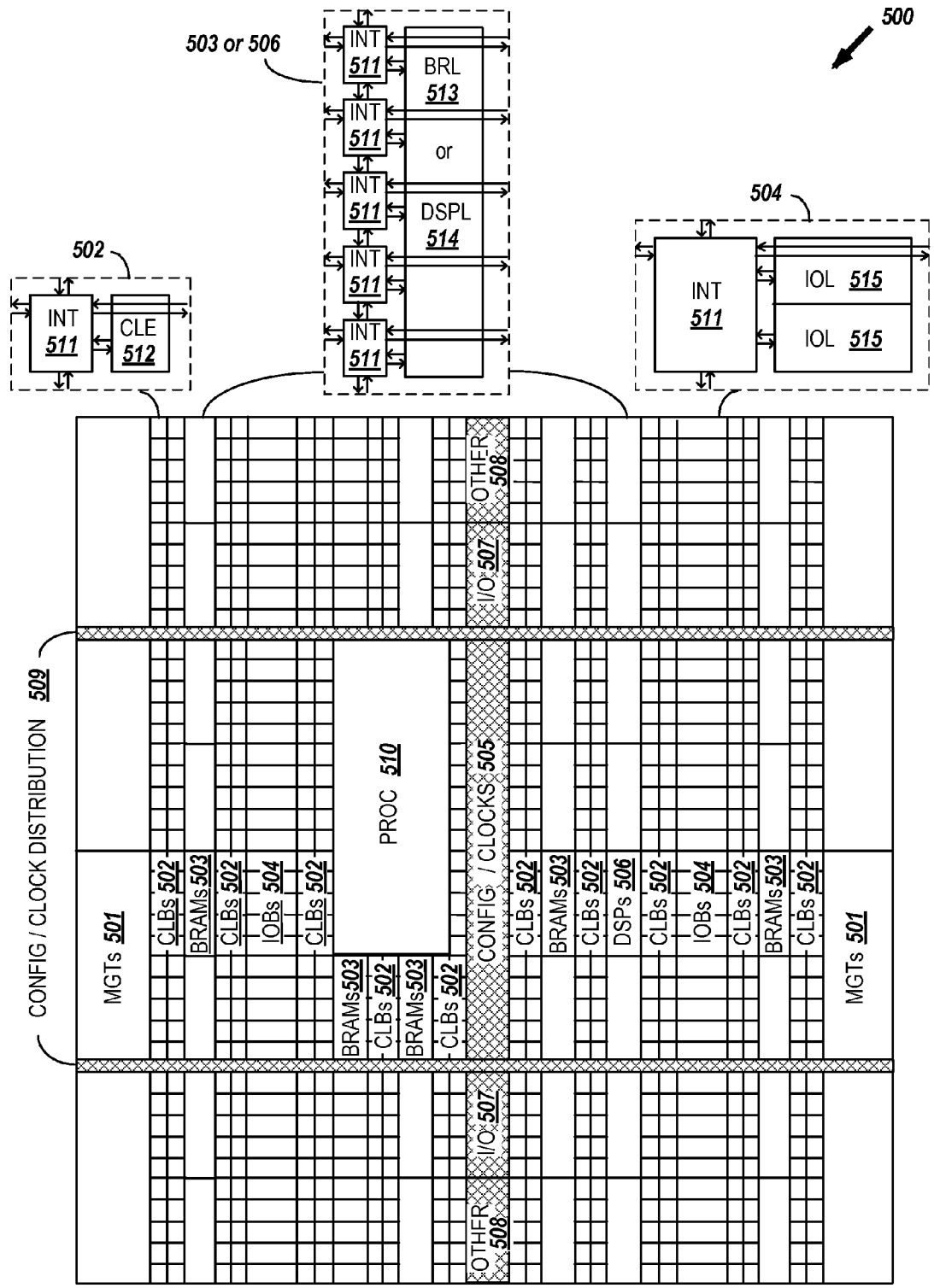
FIG. 5 illustrates a block diagram of a programmable integrated circuit that may be configured for secure configuration in accordance with one or more embodiments of the invention.

FIG. 5 illustrates a block diagram of a programmable IC that may be configured for secure configuration in accordance with one or more embodiments of the invention. Specifically FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, clock ports, and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. The BRAMs are configurable in depth and width and configurable to perform reads and writes from a number of different ports of the same or different port widths. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Figure 6:
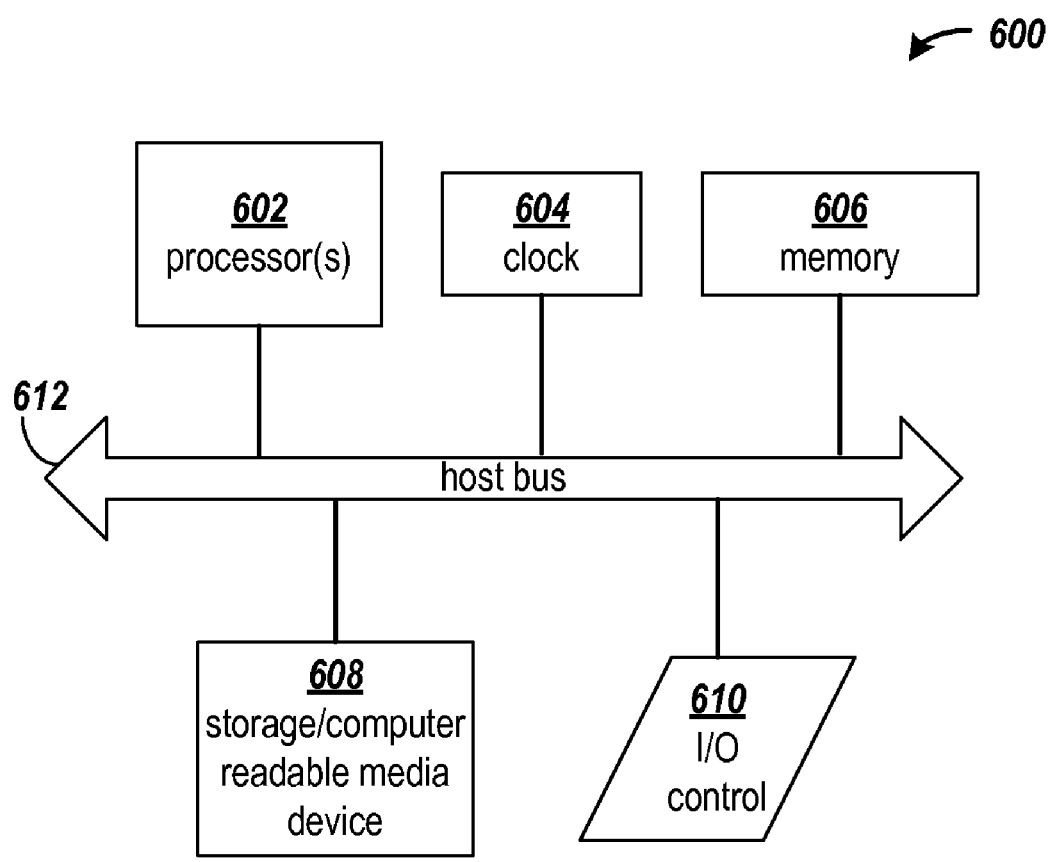
FIG. 6 illustrates a block diagram of a general purpose processor computing arrangement for implementing the processes described herein.

FIG. 6 illustrates a block diagram of a computing arrangement for implementing a secure configuration of a programmable logic in accordance with various embodiments of the invention. Those skilled in the art will appreciate that various alternative computing arrangements, including one or more processors and a memory arrangement configured with program code, would be suitable for hosting the processes and data structures and implementing the algorithms of the different embodiments of the present invention. The computer code is encoded in a processor executable format and may be stored and provided via a variety of computer-readable storage media or delivery channels such as magnetic or optical disks or tapes, electronic storage devices, or as application services over a network.

Computing arrangement 600 includes one or more processors 602, a clock signal generator 604, a memory unit 606, a storage unit 608, and an input/output control unit 610 coupled to host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory and a main memory. The storage arrangement 608 may include local and/or remote persistent storage such as provided by magnetic disks (not shown), flash, EPROM, or other persistent data storage. The storage unit may be read or read/write capable. Further, the memory 606 and storage 608 may be combined in a single arrangement.

The processor arrangement 602 executes the software in storage 608 and/or memory 606 arrangements, reads data from and stores data to the storage 608 and/or memory 606 arrangements, and communicates with external devices through the input/output control arrangement 610. These functions are synchronized by the clock signal generator 604. The resource of the computing arrangement may be managed by either an operating system (not shown), or a hardware control unit (not shown).

The disclosed embodiments are believed to be applicable to a variety of systems for encryption, decryption, and authentication. The embodiments may be used alone or in combination with other DPA mitigation techniques such as random noise generation, signal to noise reduction, random signal path delays, and/or clock skipping. Although the embodiments and examples are primarily described with reference to secure decryption of a programmable logic bitstream, the embodiments may be used to implement secure data transfers from other cryptographic devices as well, such as smart cards, encrypted flash drives, etc. Any number of block or stream encryption algorithms may be used to encrypt and decrypt bitstream frames including, XOR, DES, AES, TEA, Blowfish, RSA, etc. One skilled in the art will recognize that the plurality of cryptographic keys for use with an implemented encryption algorithms may be generated using any of a number of key generation methods known in the art. Authentication algorithms include SHA-1, SHA-256, SHA-512 HMAC and others.

Other aspects and embodiments will be apparent to those skilled in the art from consideration of the specification and practice disclosed herein. It is intended that the specification and illustrated embodiments be considered as examples only, with a true scope and spirit of the invention being indicated by the following claims.

What is claimed is:

1. A method for secure configuration of a programmable integrated circuit (IC), comprising:

inputting a configuration bitstream to the programmable IC, the programmable IC having a first cryptographic key stored in a persistent memory, the configuration bitstream having a first portion that is encrypted with the first cryptographic key and that includes a second cryptographic key, and the configuration bitstream having a second portion encrypted with the second cryptographic key;

decrypting the encrypted first portion of the configuration bitstream using the first cryptographic key on the programmable IC;

obtaining the second cryptographic key from the decrypted first portion of the configuration bitstream;

decrypting the encrypted second portion of the configuration bitstream by the programmable IC using the second cryptographic key obtained from the decrypted first portion of the configuration bitstream; and storing configuration data from the decrypted second portion of configuration bitstream in configuration memory of the programmable IC, wherein:

the configuration bitstream includes a key address of the persistent memory corresponding to the first cryptographic key in the configuration bitstream;

at least a second decryption key is stored in the persistent memory of the programmable IC; and decrypting the encrypted first portion of the configuration bitstream with the first cryptographic key includes retrieving the first cryptographic key from a location of the persistent memory indicated by the key address.

2. The method of claim 1, wherein the configuration bitstream includes a third portion and a fourth portion, the third portion encrypted with the first cryptographic key and including a third cryptographic key, and the fourth portion encrypted with the third cryptographic key and including configuration data, the method further comprising:

decrypting the encrypted third portion of the configuration bitstream using the first cryptographic key;

decrypting the encrypted fourth portion of the configuration bitstream using the third cryptographic key from the decrypted third portion of the configuration bitstream; and storing the decrypted configuration data from the decrypted fourth portion of the configuration bitstream in the configuration memory of the programmable IC.

3. The method of claim 1, further comprising storing configuration data from the decrypted first portion of configuration bitstream in the configuration memory of the programmable IC.

4. The method of claim 1, wherein the first portion of the configuration bitstream includes a cipher text block length value indicative of lengths of cipher blocks in the configuration bitstream.

5. The method of claim 4, wherein the decrypting of the encrypted second portion of the configuration bitstream with the second cryptographic key from the decrypted first portion of the configuration bitstream includes:

selecting a block of the input configuration bitstream following the first portion of the configuration bitstream, the selected block having a length equal to the cipher text block length value; and decrypting the selected block using the second cryptographic key.

6. The method of claim 1, wherein the configuration bitstream includes a third portion encrypted with the second cryptographic key, the method further comprising:

decrypting the encrypted third portion of the configuration bitstream using the second cryptographic key; and storing decrypted configuration data from the decrypted third portion of configuration bitstream in the configuration memory of the programmable IC.

7. The method of claim 6, wherein:
the second and third portions of the configuration bitstream are adjacent portions of the configuration bitstream; and
each of the second and third portions of the configuration bitstream has a length equal to a cipher text block length.

8. The method of claim 1, wherein the second portion of the configuration bitstream includes a third cryptographic key and the configuration bitstream includes a third portion encrypted with the second cryptographic key, the third portion of the configuration bitstream includes configuration data, the method further comprising:
decrypting the encrypted third portion of the configuration bitstream using the second cryptographic key from the decrypted second portion of the configuration bitstream; and
storing the decrypted configuration data from the decrypted third portion of the configuration bitstream in the configuration memory of the programmable IC.

9. The method of claim 1, wherein the programmable IC is configured to selectively prevent readout of the persistent memory.

10. The method of claim 1, wherein the configuration bitstream includes a third portion encrypted with a third cryptographic key, the third portion of the configuration bitstream including configuration data, the third portion of the configuration bitstream located after the first portion and prior to the second portion in the configuration bitstream, the method further comprising:
decrypting the encrypted third portion of the configuration bitstream using the third cryptographic key after the decrypting of the first portion of the configuration bitstream and prior to the decrypting of the second portion of the configuration bitstream.

11. The method of claim 10, wherein the third cryptographic key is equal to the first cryptographic key.

12. The method of claim 10, further comprising performing key expansion of the second cryptographic key concurrently with the decrypting of the third portion of the configuration bitstream.

13. The method of claim 1, further comprising authenticating the second cryptographic key after decryption of the first portion of the configuration bitstream.

14. A cryptographic device, comprising:
a persistent memory; and
a decryption circuit coupled to the persistent memory, the decryption circuit configured to:
receive an encrypted data stream including a plurality of data blocks and a plurality of cryptographic keys exclusive from the plurality of data blocks;
decrypt a first portion of the encrypted data stream using a cryptographic key stored in the persistent memory, the first portion including a first one of the plurality of cryptographic keys;
decrypt a second portion of the encrypted data stream using the first one of the plurality of cryptographic keys, the second portion of the encrypted data stream including a first one of the plurality of data blocks;
decrypt a third portion of the encrypted data stream using the cryptographic key stored in the persistent memory, the third portion of the encrypted data stream including a second one of the plurality of cryptographic keys; and
decrypt a fourth portion of the encrypted data stream using the second one of the plurality of cryptographic keys from the decrypted third portion of the encrypted data stream, the fourth portion of the encrypted data stream including a second one of the plurality of data blocks.

15. The cryptographic device of claim 14, wherein the decryption circuit is further configured to:
decrypt a third portion of the encrypted data stream using the cryptographic key stored in persistent memory, the third portion of the encrypted data stream including a second one of the plurality of data blocks.

16. A method for encrypting a message, comprising:
inputting an unencrypted message;
generating a plurality of cryptographic keys, the plurality of cryptographic keys not derived from the unencrypted message;
encrypting a first block using a first one of the plurality of cryptographic keys, the first block including a second one of the plurality of cryptographic keys;
encrypting a second block using the second one of the plurality of cryptographic keys, the second block including a first portion of the unencrypted message;
storing the first and second encrypted blocks in a processor-readable medium;
encrypting a third block including a third cryptographic key using the first one of the plurality of cryptographic keys;
encrypting a fourth block including a second portion of the unencrypted message using the third one of the plurality of cryptographic keys; and
storing the third and fourth encrypted blocks along with the first and second encrypted blocks in the computer readable media.

17. The method of claim 16, wherein the first block includes a second portion of the unencrypted message.

* * * * *